(12) United States Patent
Fitzsimons et al.

(10) Patent No.: US 6,708,189 B1
(45) Date of Patent: Mar. 16, 2004

(54) COMPUTER FILE TRANSFER SYSTEM

(75) Inventors: Michael E. Fitzsimons, New York, NY (US); Brian G. Fitzsimons, Short Hills, NJ (US); Colin E. Snyder, Portland, ME (US)

(73) Assignee: DeskNet, Inc., New York, NY (US)

( * ) Notice: Subject to any disclaimer, the term of this patent is extended or adjusted under 35 U.S.C. 154(b) by 0 days.

(21) Appl. No.: 09/536,014

(22) Filed: Mar. 27, 2000

Related U.S. Application Data

(63) Continuation-in-part of application No. 08/941,442, filed on Sep. 30, 1997, now abandoned.

(51) Int. Cl.⁷ ............................................... G06F 17/30
(52) U.S. Cl. ..................... 707/205; 707/200; 707/202; 707/203; 709/227; 345/302
(58) Field of Search .................... 707/6, 101, 200, 707/203, 205, 513, 8, 10, 202; 345/302; 709/227

(56) References Cited

U.S. PATENT DOCUMENTS

| | | | |
|---|---|---|---|
| 5,557,798 A | | 9/1996 | Skeen et al. .................. 705/35 |
| 5,566,332 A | * | 10/1996 | Adair et al. ................. 707/101 |
| 5,634,064 A | * | 5/1997 | Warnock et al. ............. 707/513 |
| 5,675,780 A | * | 10/1997 | Plant-Mason et al. ......... 707/6 |
| 5,717,922 A | * | 2/1998 | Hohensee et al. ........... 707/100 |
| 5,745,360 A | * | 4/1998 | Leone et al. ................. 707/513 |
| 5,983,240 A | * | 11/1999 | Shoroff et al. .............. 707/200 |
| 6,021,408 A | * | 2/2000 | Ledain et al. .................. 707/8 |
| 6,065,024 A | * | 5/2000 | Renshaw ..................... 707/513 |
| 6,081,262 A | * | 6/2000 | Gill et al. .................... 345/302 |
| 6,094,684 A | * | 7/2000 | Pallmann ..................... 709/227 |

OTHER PUBLICATIONS

"Scattering and Gathering Data Among Presentation Spaces", IBM technical Disclosure Bulletin, Mar. 1990, vol. 32, No. 10B, pp. 24–27.*

Mauger et al., "QoS Guarantees for Multimedia Services on a TDMA–based Satellite Network", IEEE, 1997, pp. 56–65.*

* cited by examiner

*Primary Examiner*—Thuy N. Pardo
(74) *Attorney, Agent, or Firm*—Welsh & Katz, Ltd.

(57) ABSTRACT

A method and apparatus are provided for converting a data file received by an automated publishing system from a source for use within one of a plurality of presentation spaces of the automated publishing system. The method includes the steps of parsing the data file to recover an identifier of the source and an information content to be used by the automated publication system and identifying a presentation space of the plurality of presentation spaces for the parsed file based upon the identifier of the source and reformatting the information content of the parsed file for use within the identified presentation space based upon a set of predetermined attributes associated with the identified presentation space.

42 Claims, 14 Drawing Sheets

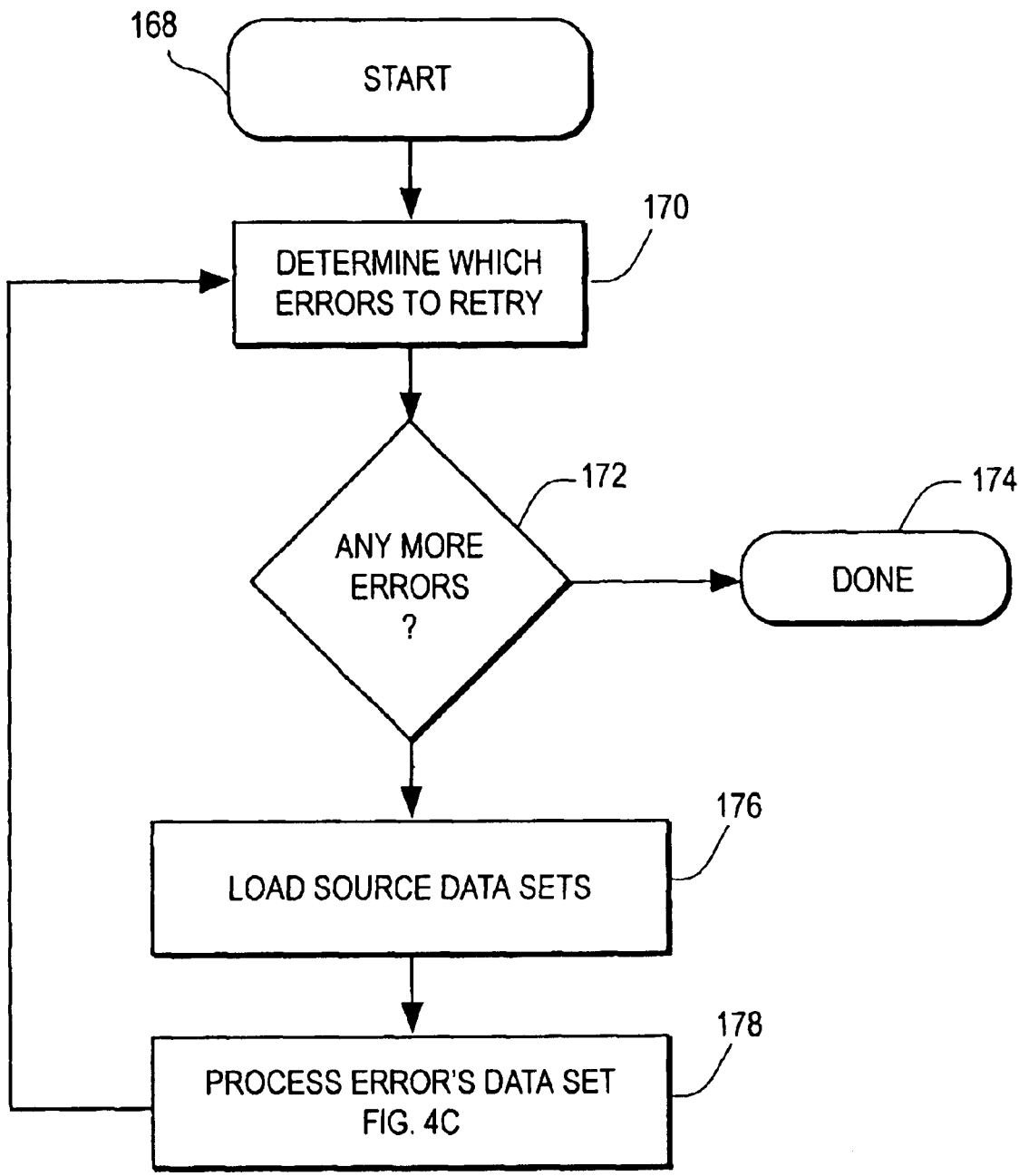

FIG. 9

☒ Fill with copy

BOH Name: [                    ] [Select...]
Copy: [Inc Data: Content]        [Select...]

☒ Retain style information   ☒ Delete existing copy before filling

FIG. 10

Check in a New Article

File Information (the file or template you're checking in)

Folder: [Centris 650 Desktop Folder: My Template folder:] [Select...]
File Name: [Inc Data: Template]                            [Select...]

QPS Information

QPS Name: [Src Info: File Name]   [Select...]
Section: [Inc Data: Section]      [Select...]
Status: [Assigned]                [Select...]
Routed to: [Src Info: File's Folder] [Select...]

☒ Fill with copy

BOH Name: [                    ] [Select...]
Copy: [Inc Data: Content]        [Select...]

☒ Retain style information   ☒ Delete existing copy before filling

Options
☒ Check in new file only when query finds no matches
☐ Delete local file after checking it in

[Cancel] [OK]

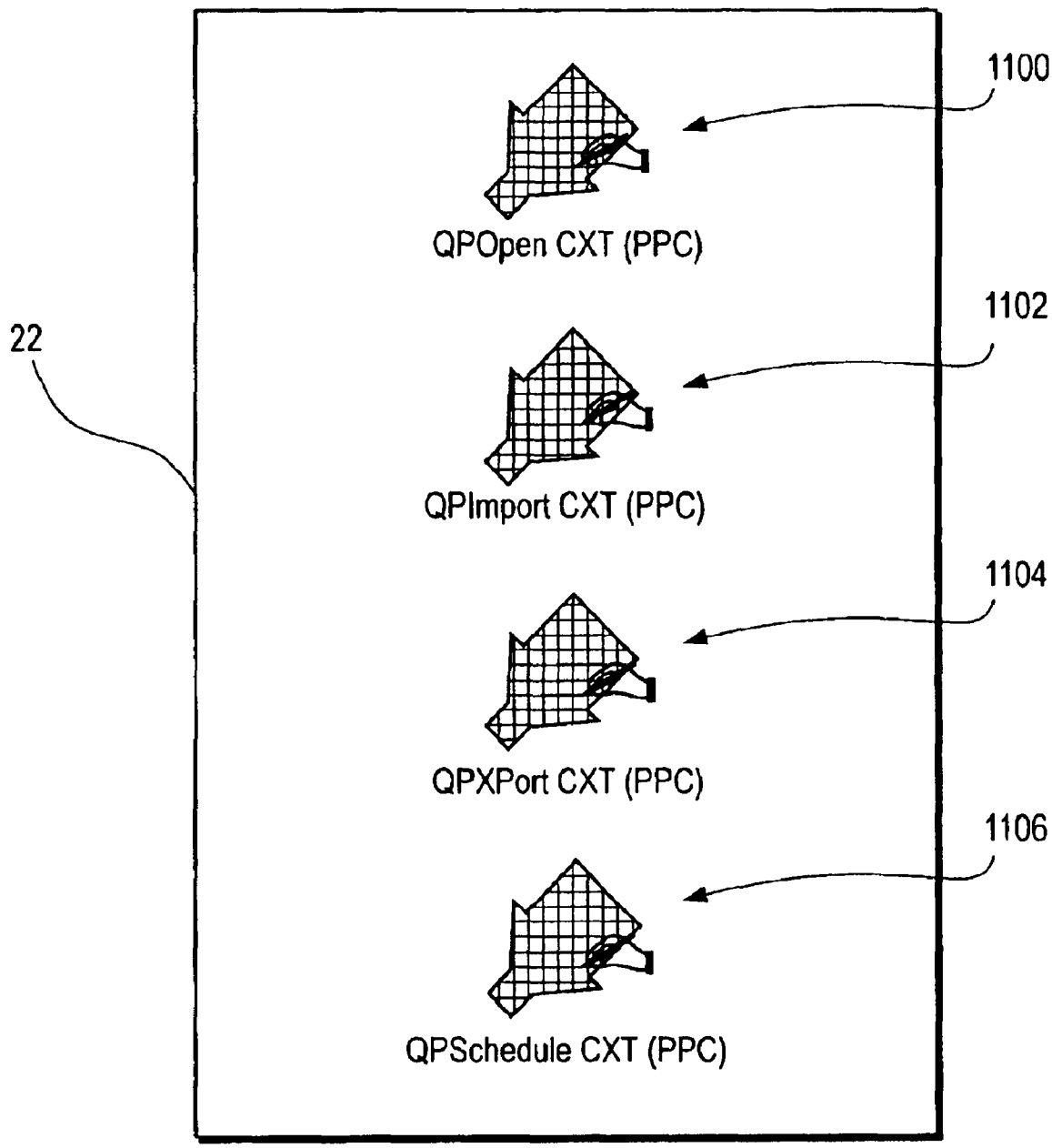

COMPUTER FILE TRANSFER SYSTEM

This application is a continuation-in-part of U.S. application Ser. No. 08/941,442, filed on Sep. 30, 1997 (now abandoned).

FIELD OF THE INVENTION

The field of the invention relates to computers and more particularly to computers which must exchange files, but which use different data structures.

BACKGROUND OF THE INVENTION

Computers which use the same database are known. Such systems typically use the same operating system (e.g., UNIX, DOS, etc.) and often the same software (e.g., WordPerfect, MS Word, etc.) in the generation of those files. Where the files are generated using the same software and stored in a common database, each computer of a system may equally access the file data without difficulty.

In other cases, where different software is used for file generation (i.e., WordPerfect or MS Word), a conversion must be performed. Such conversion must often be performed as a two-step process. For example, where a first computer using a first type of software (e.g., WordPerfect) stores a file, and a second computer wishes to process that file using a second type of software (e.g., MS Word), then either the first or second computer may convert the WordPerfect file to the MS Word format.

The first or second computer may first load WordPerfect to read the file. That computer may then use a WordPerfect utility to store the file under the second format (e.g., MS Word). The second computer must then load MS Word and read the file.

Where the first and second computers do not share the same database, or are located remotely, the process becomes more difficult. For example, the first computer may store a file in its database using WordPerfect and may wish to transfer the file to a second computer for use in MS Word. The first computer may transfer the file as originally stored or convert to another format. Where the first computer converts to a different format, the file may be converted into MS Word or a common format (e.g., ASCII) before transfer. Where the second computer does not use (or have) MS Word, the file may have to be transferred in a common format. The first computer may then dial a telephone number of the second computer through a modem and transfer the file to the second computer. Alternatively, the file may be e-mailed to the second computer.

At the second computer, the file may be received and stored. Where the second computer does not know the format under which the first computer stored the file, the second computer may be forced to determine the format by trial and error. Alternatively, where the format is ASCII, the second computer may be able to convert to the local format by loading the ASCII data.

In either case, the transfer of files among computers is difficult and time consuming. Accordingly, a need exists for a means of exchanging files which automatically adapts to the format of the receiving or transmitting party.

SUMMARY

A method and apparatus are provided for converting a data file received by an automated publishing system from a source for use within one of a plurality of presentation spaces of the automated publishing system. The method includes the steps of parsing the data file to recover an identifier of the source and an information content to be used by the automated publishing system and identifying a presentation space of the plurality of presentation spaces for the parsed file based upon the identifier of the source and reformatting the information content of the parsed file for use within the identified presentation space based upon a set of predetermined attributes associated with the identified presentation space.

BRIEF DESCRIPTION OF THE DRAWINGS

FIGS. 4A–H is a flow chart of steps used by the system of FIG. 1;

FIG. 9 depicts a replace article content menu screen that may be used by the system of FIG. 1;

FIG. 10 depicts a check in a new article menu screen that may be used by the system of FIG. 1; and FIG. 11 depicts a file transfer initiation menu screen that may be used by the system of FIG. 1.

DETAILED DESCRIPTION

Figure 1:
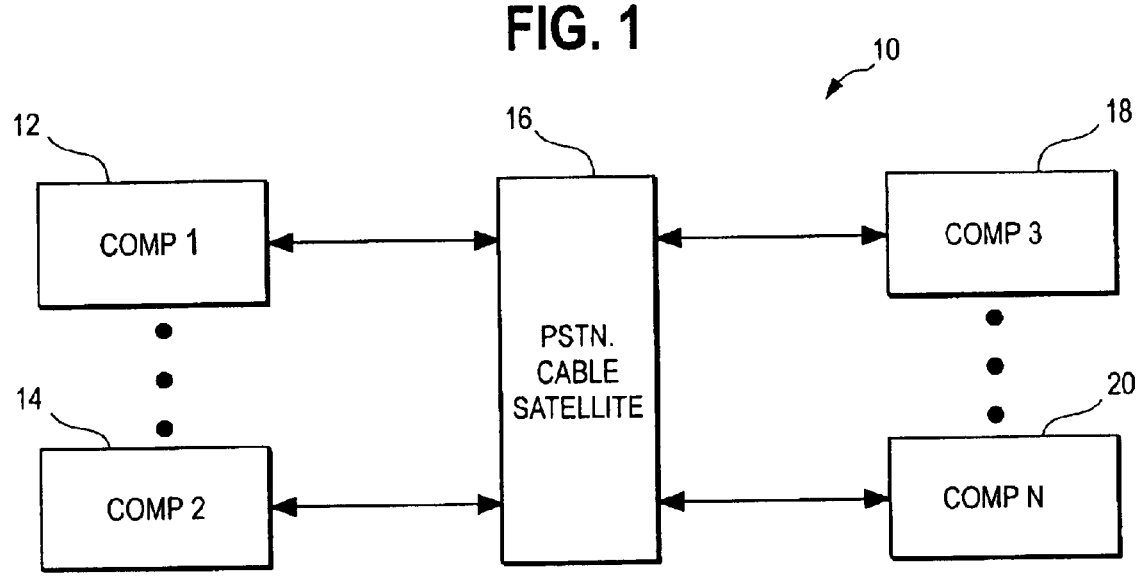
FIG. 1 is a block diagram of a system for transferring files under an embodiment of the invention.

FIG. 1 is a block diagram of data transfer system 10, generally, under an illustrated embodiment of the invention. The system 10 has been found to have a particular usefulness in text or image file processing.

Under the embodiment, one or more computers (e.g., computers 12, 14, 18, 20) may operate under different data structures and be geographically separated. An interconnection may be provided between the computers 12, 14, 18, 20 through the public switched telephone network (PSTN) or cable or satellite 16.

Under one embodiment, a method and apparatus are provided for executing seamless file transfers and reformatting and/or processing of transferred files based upon predetermined criteria. As used herein, the term "file" means an assembly of bytes and associated information (e.g., file names, headers, etc.). The method used herein is transparent to the type of software used in file generation.

Unlike conventional solutions, which rely on human intervention to accomplish reformatting, the system described herein re-formats the data automatically for use by a utility (e.g., a page layout tool) of the receiving computer. The system functions to convert a data file created under a first format into a corresponding data file under a second format. It should be understood that reference made herein to the second format and to reformatting refer primarily to attributes associated with visual presentation of a content of the file within a predetermined presentation space. Reformatting may be accomplished by the receiving processor, by itself or in conjunction with file parametric data generated by the sending computer. The specific reformatting imposed upon a particular file is dependent upon both an identifier of a source of the file and the original encoding format.

A specific destination and presentation space for the reformatted file may be determined from a file destination directory based upon the identifier of the source of the file. The specific formatting may be adjusted by a receiving computer to conform to that destination and presentation space based upon the requirements of that space.

The actual mechanism of reformatting (i.e., a software robot) operates between conventional forms of software to avoid the time consuming processes used by the prior art. Errors are captured and segregated to subsets of the transferred file. Correction of errors may be accomplished off-line either automatically by a re-transmission or by manual intervention.

The software robot functions to bridge information between multiple databases or electronic file formats. Connectivity between any two file structures and databases may be accomplished using "plug-in" components to monitor, retrieve data, reconstitute and deliver data or perform actions. The plug-in components of the software robot allow the software robot to bridge any number of electronic file formats and databases in a modular fashion.

A significant feature of the software robot is that it can bridge any possible combination of data structures, databases and file formats. Since the software robot is not designed for a specific product, the software robot is open in the sense that it may be used with any combination of data structures, databases and file formats.

For example, in addition to text processing, the software robot may also process photographs and other graphics information. Numerical data may be provided under a first format for conversion into charts or graphs. The software robot using an appropriate utility (e.g., DeskNetAPS-DeltaGraph) may be used to format data into presentation spaces appropriate for their use.

Other utilities (e.g., DeskNetAPS-Lotus Notes) allow simultaneous access to a common document. For example, a first and second computer 32, 34 may simultaneously modify a document located within a document management system 36 while the software robot maintains current copies in front of each user.

By the use of the word "connecting" or "bridging", it is meant that the software robot can retrieve data from one database or file format and place it into another database or electronic format, thereby bridging information between systems or electronic files. Since it is an open concept, a module may be provided for any existing or yet to be developed software or combination of software. Further, the act of connecting or bridging may, by definition, include specific steps required by the business logic of an organization using the software robot.

As used herein, business logic refers to a particular paradigm used by the business in processing information or in creating a particular product used by the business. While a particular business logic may result in data reformatted for internal usage, the software robot described herein may find particular usage in allowing a business logic to prepare data for purposes of visual presentation to the general public.

The business logic may be incorporated into the software robot through a process called scripting. Using scripting, the business logic may be used to connect databases, construct files, de-construct files, populate presentation spaces, or distribute reformatted files.

For example, a company may use the software robot to assembly information for presentation purposes. The information may be received from various sources and the features of the software robot may be used to prepare 401k statements in compliance with governmental regulations. Further, presentation and publication may occur under any of a number of presentation mediums (e.g., paper and ink, e-mail, web pages on a website, etc.).

Where the presentation space is a website, a set of attributes may be used to define an HTML document compatible with the space. A presentation script (e.g., DeskNetAPS-HTML) associated with the source identifier operates upon the source file to reformat the file for presentation into that space. A further utility (e.g., DeskNetAPS-Web) functions as a direct file transfer mechanism over the Internet.

An organization that may find the software robot particularly beneficial may be a publishing organization (e.g., newspaper, magazine publisher, etc.). The business logic may require that files containing text and/or graphics (e.g., newspaper articles, photographs, charts, etc.) may be received from disparate sources and be incorporated into a predefined presentation space (e.g., a series of newspaper pages).

The presentation space may be broken up in a manner required by the business logic. For example, a large area at a top of the presentation space may be reserved for predetermined indicia of subject matter content (e.g., a headline). Further, information presented within the space may be subject to certain size limitations (e.g., column width, column length, etc.).

In the case of a publisher, the business logic may require for a given day's publication that the presentation space may be broken up into a number of subspaces for inclusion of material from a respective number of sources. Specific writers may be assigned to provide materials for each of the respective subspaces by an editor or other designated agent in accordance with the business logic of the organization. The respective subspaces may be correlated to an identifier of the source (and vice versa) using a destination directory.

The identifier of the source may be correlated to a source file using any of a number of different criteria. In some cases, a password used to access the destination computer may be used to identify the source. Alternatively, a name of the author may be included within the file. The file may include a title which may have been previously assigned to an author and which may be used as an indicator or the identity of the source.

As the writer (i.e., the source) provides the assigned materials, the destination directory may be accessed to identify the assigned subspaces as the destination for those materials. The destination directory may also be used to identify a set of attributes (e.g., column size, font, etc.) for use of the materials in that space.

In general, the software robot may be used by a publishing organization to allow users to connect to and transfer a file under a specific format (e.g., Lotus Notes) to a publishing database (e.g., a Quark Publishing System (QPS) database). If the user should choose, he could change the software of either end without changing the software robot. Lotus Notes may be connected to a QuarkXPress document file format, or perhaps a SYBASE database may be connected to a QPS database. The user could tie a mainframe or mini-frame system to a software database running on a desktop computer to place the data into a specific file structure for ready use by either end of the connection.

In the case of the system 10 shown in FIG. 1, a writer (not shown) may use Lotus Notes operating on a first computer (e.g., personal computer 12) to prepare an sports article for publication in a newspaper. The newspaper may compose a number of articles into daily publications using QuarkXPress operating on a second computer (e.g., 18). As used herein, composing articles into publications by the newspaper means fitting received articles into destination spaces that have been predetermined by the newspaper editor in accordance with the business logic. The first computer 12 may be linked to the second computer 18 through the PSTN 16. To transfer the article, the writer causes an action (i.e. the first computer 12 requests a connection with the second computer 18).

The second computer 18 accepts the connection, exchanges passwords and the first computer may transfer the sports article under the Lotus Notes format into a previously created "hot" file named "My Article" within a memory (not shown) of the second computer 18. A hot file, as used herein, is simply a file containing data under a format which is incompatible with the text processing of the second computer 18.

Conversion of hot files may be accomplished by manual activation or automatically. FIG. 11 shows a menu that may be displayed on a monitor 22 of the computer 18. Activation of the software robot for manual conversion of hot files may be accomplished by selection of the icon 1102 labeled QPImport.

Figure 5:
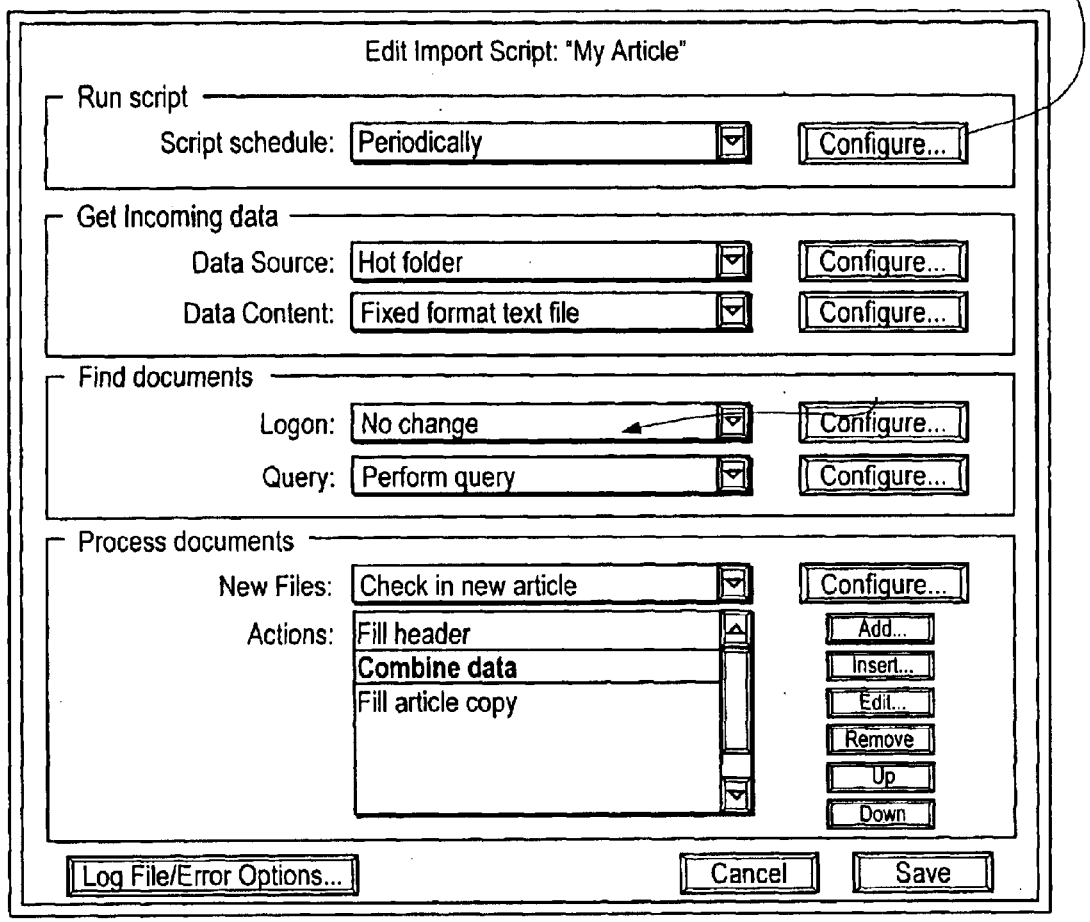
FIG. 5 depicts an edit import menu screen that may be used by the system of FIG. 1.
Figure 6:
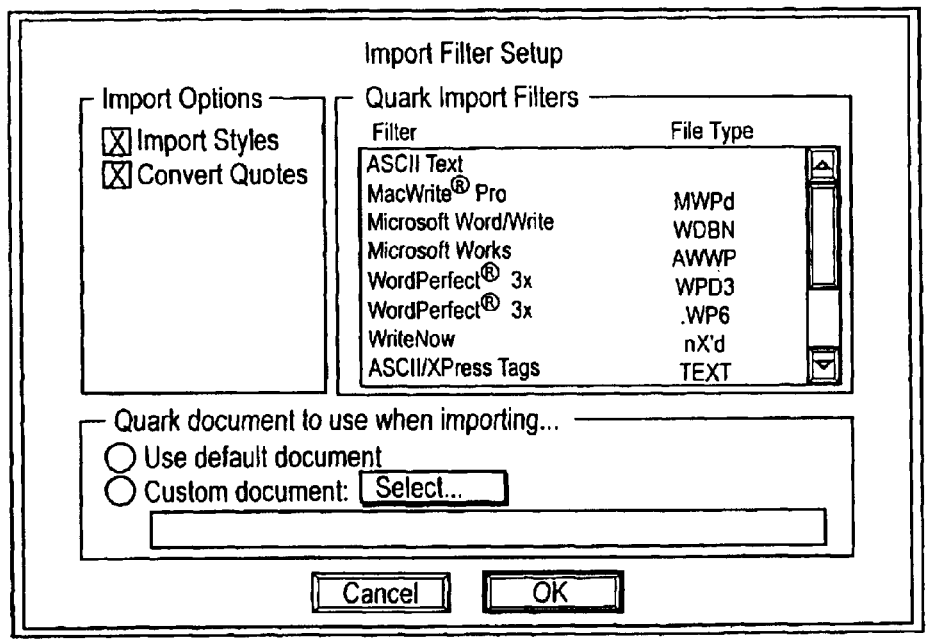
FIG. 6 depicts an import filter setup menu screen that may be used by the system of FIG. 1.
Figure 7:
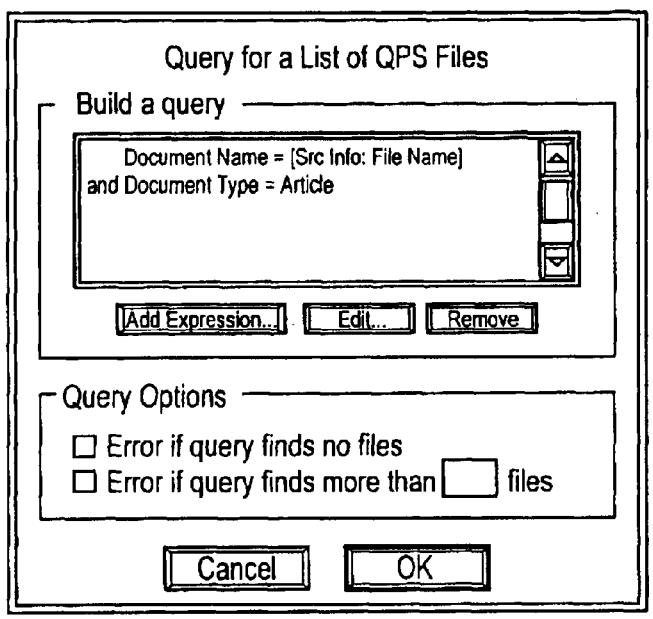
FIG. 7 depicts a query for a list of QPS files menu screen that may be used by the system of FIG. 1.

Activation of the icon 1102 labeled QPImport may display the screen 500 shown on FIG. 5 and may be used to initially create the hot file labeled "My Article". Following creation of the hot file labeled "My Article", data may be downloaded as described above from the remote computer 12 at random.

Following downloading of data into the hot file, conversion may be scheduled by activation of the pull down menu 502 labeled Script Schedule. Conversion may be triggered by any number of events as depicted on the screen 500 of FIG. 5, or conversion may be activated manually through the pull down menu 502 shown.

Figure 2:
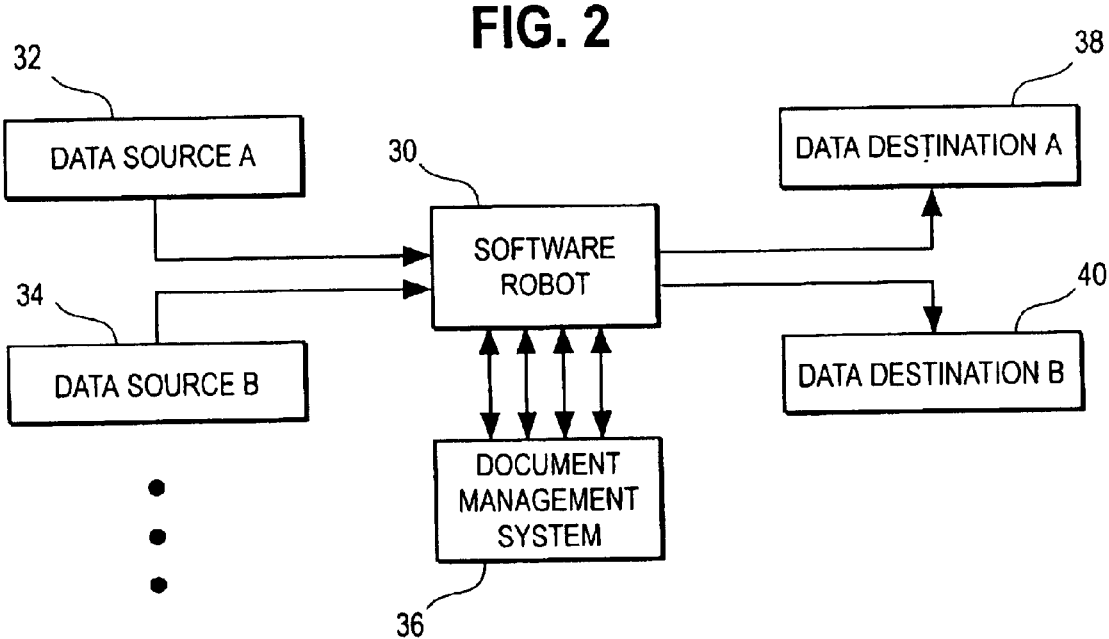
FIG. 2 depicts an information flow block diagram of the system of FIG. 1.

FIG. 2 shows a block diagram of data flow. Data may be retrieved from any of a number of data sources 32, 34 containing hot files. Once retrieved, the data is processed by the software robot 30 and stored. The data may be stored within a document management system 36 which collects documents of a particular type for integration into a corresponding file destination within a finished document (e.g., a complete newspaper) or the documents may be archived for later use in long-term storage (e.g., into data destinations A and B 38, 40).

Figure 3:
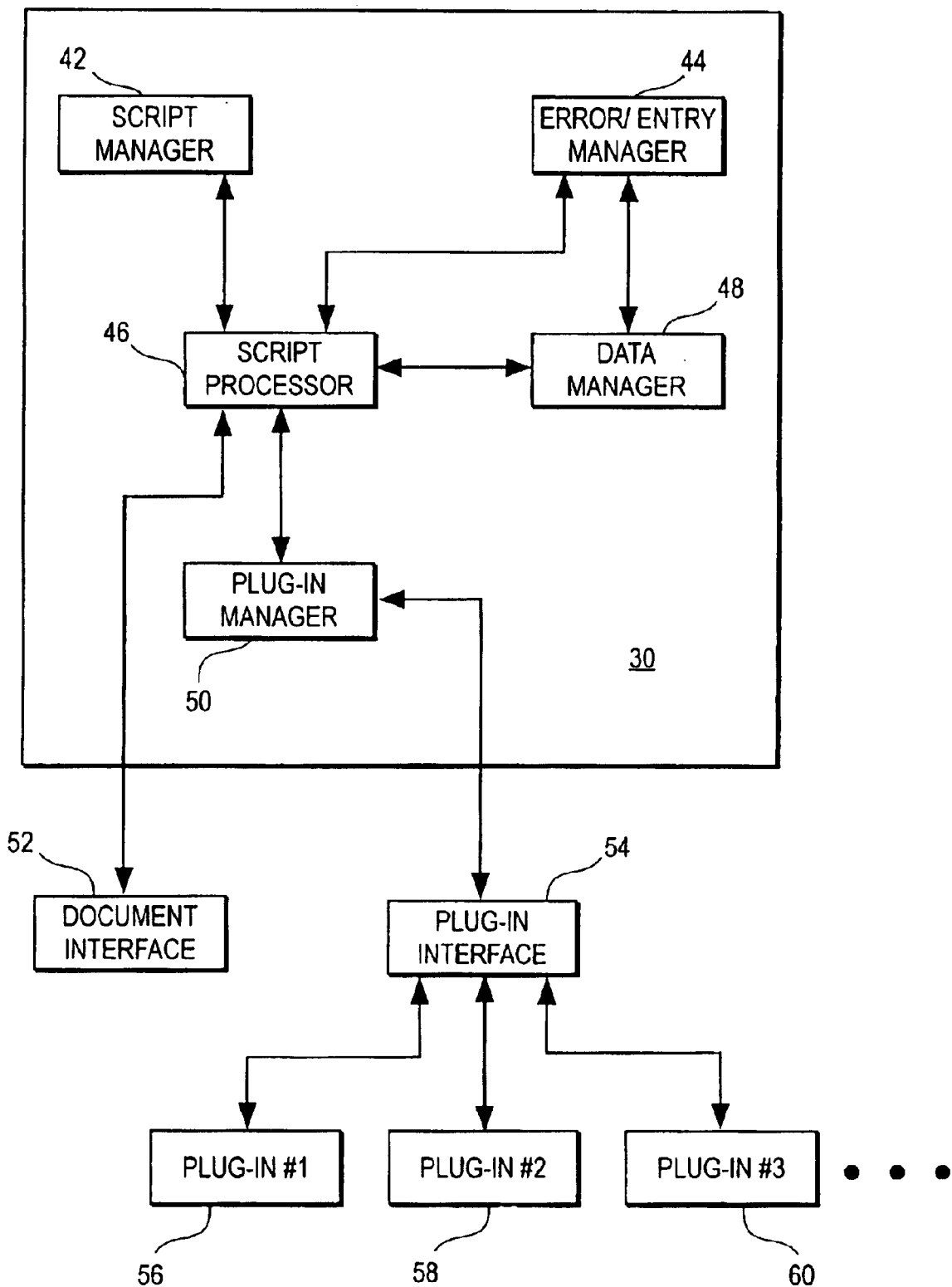
FIG. 3 depicts an information flow block diagram of the system of FIG. 1.

FIG. 3 shows a block diagram of processor system used for operation of the software robot 30. Upon activation of the software robot by selection of the proper icon 1100, 1102, 1104, 1106 (FIG. 11), a script manager 42 causes the script processor 46 to begin executing the software robot. A data manager 48 may instruct the script processor 46 to process the hot file labeled "My Article". The script processor 46 may retrieve the data from a data interface 52 (e.g., data source A 32) and begin processing the data. Based upon the type of data (e.g., MS Word, Lotus Notes, WordPerfect, etc.), the script processor may load certain plug-ins through a plug-in manager 50. The plug-ins 56, 58, 60 may be stored in a hard drive (e.g., data source A 32). Manager 50 and plug-in interface 54 may simply provide an interface system between the processor 46 and hard drive. As the script processor 46 processes data, errors are collected by the error/retry manager 44. Following processing of the hot file, the errors may be corrected automatically by the error/retry manager or manually by the operator.

Figure 4A:
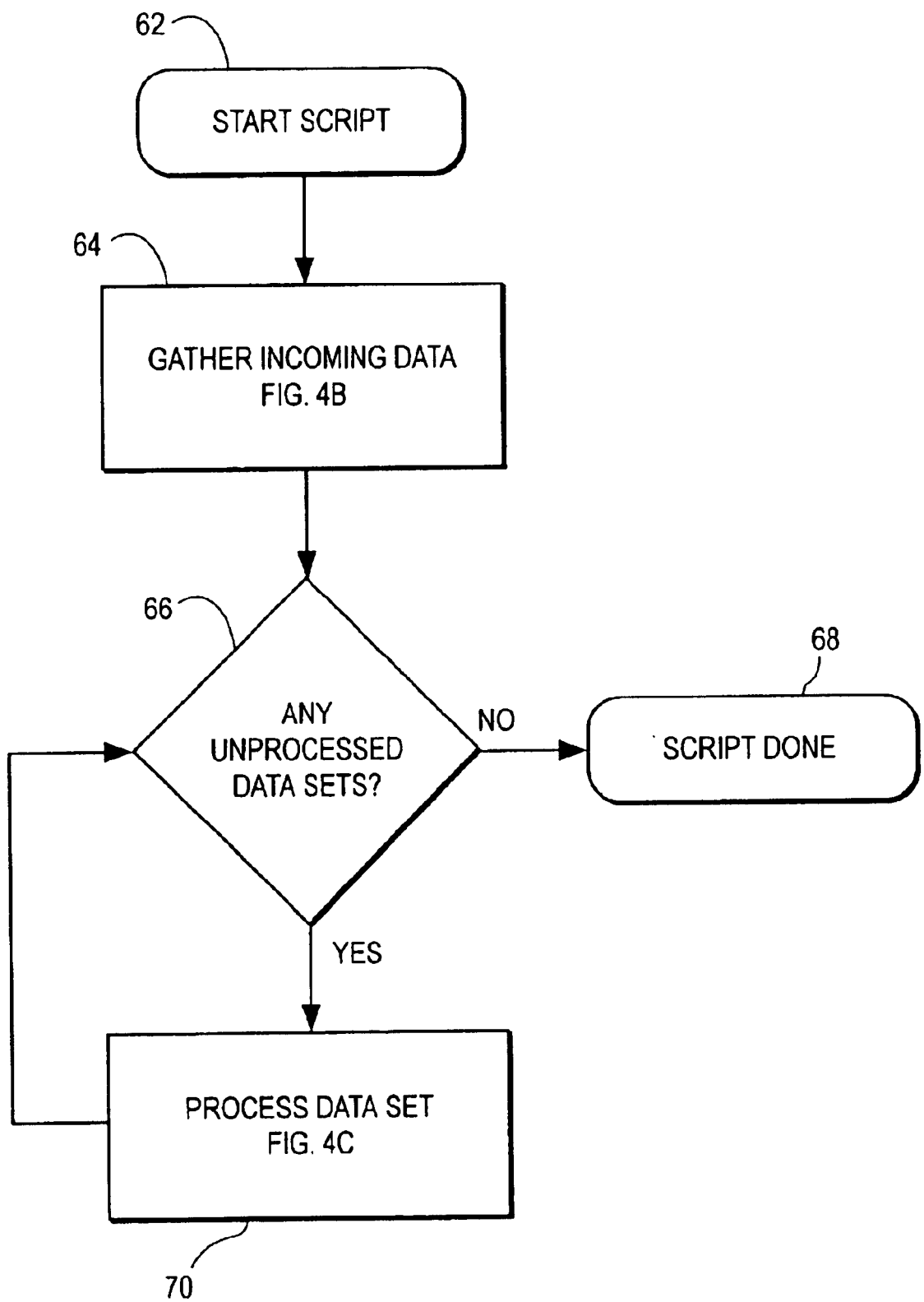
Figure 4B:
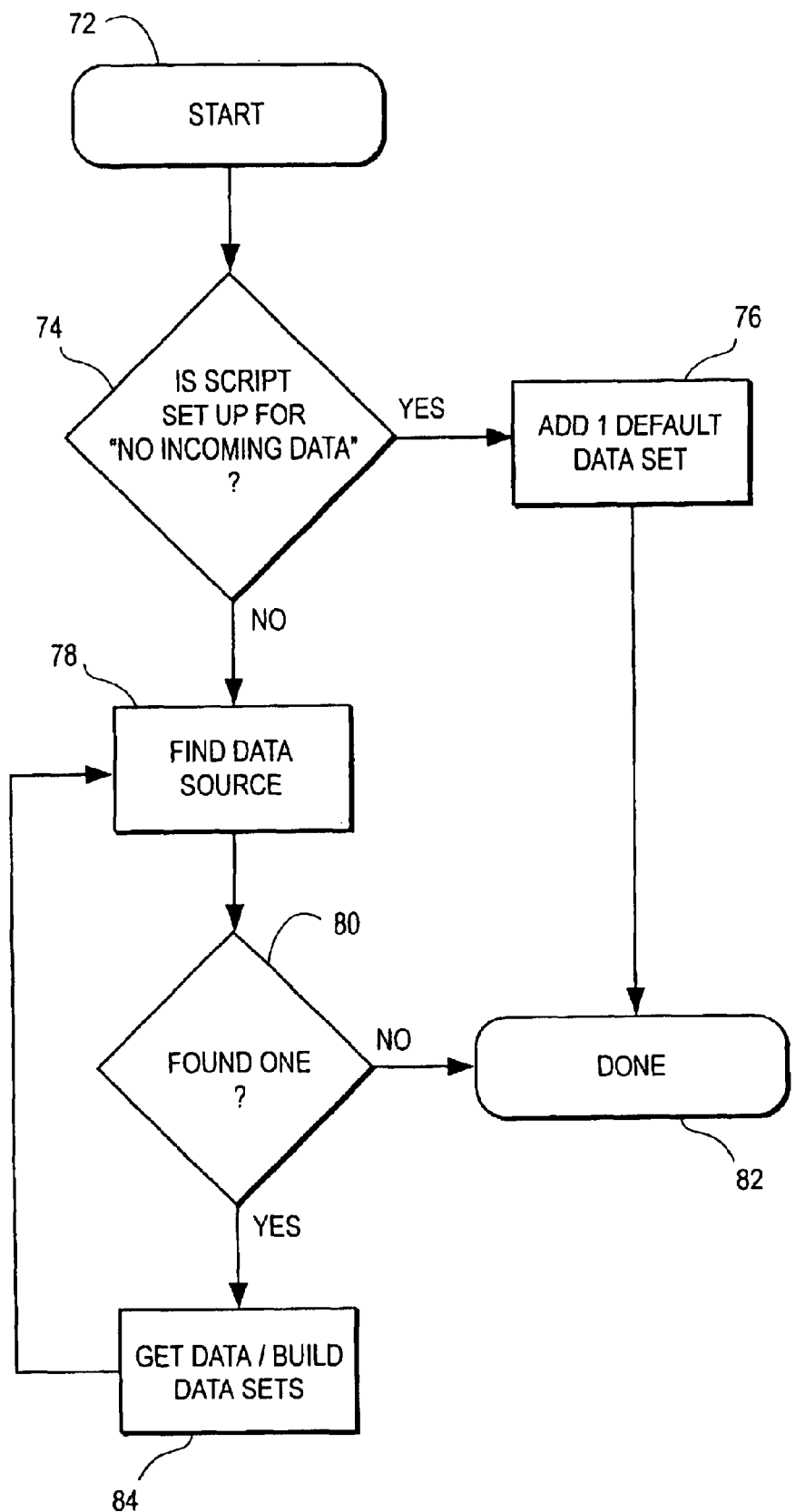
Figure 4C:
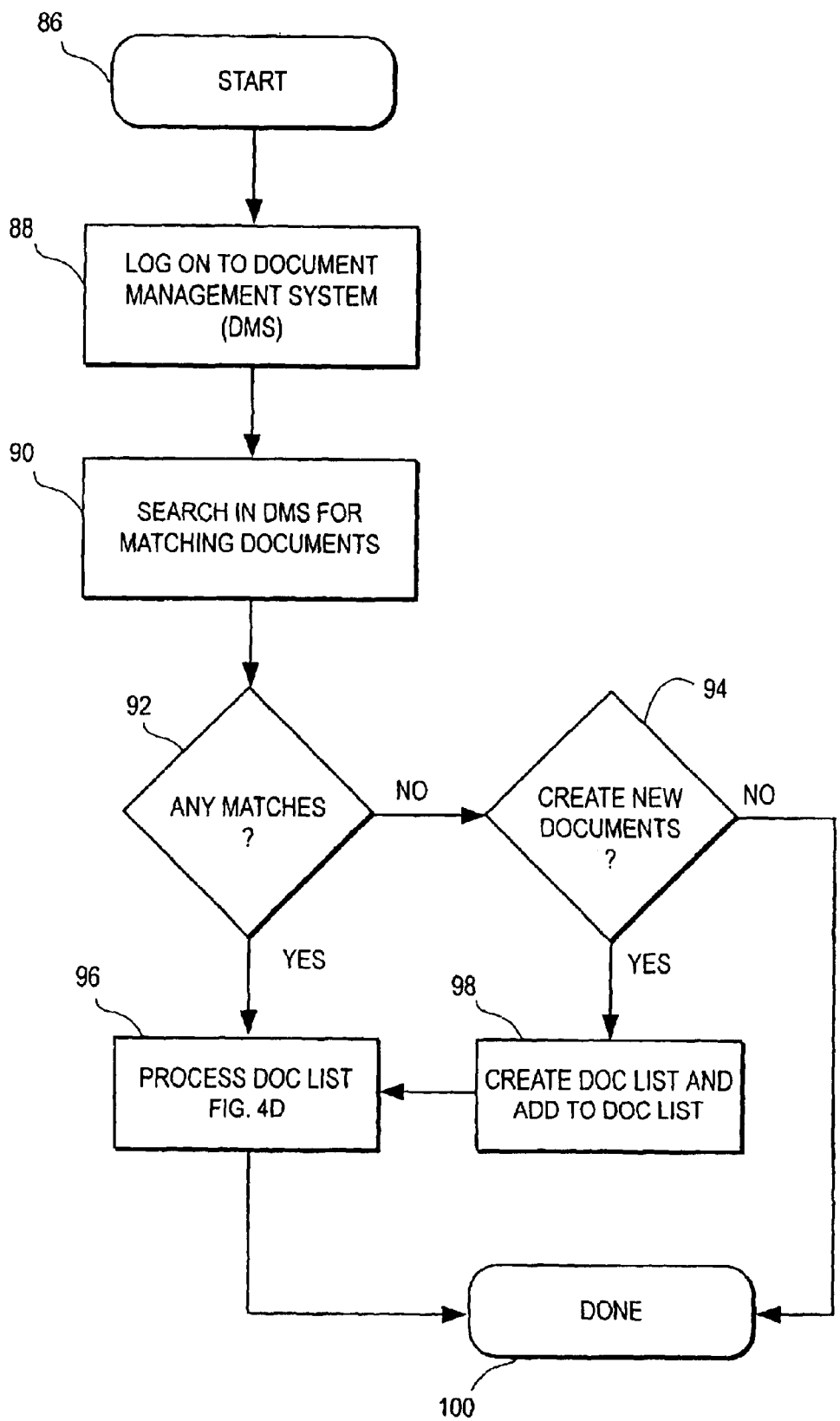
Figure 4D:
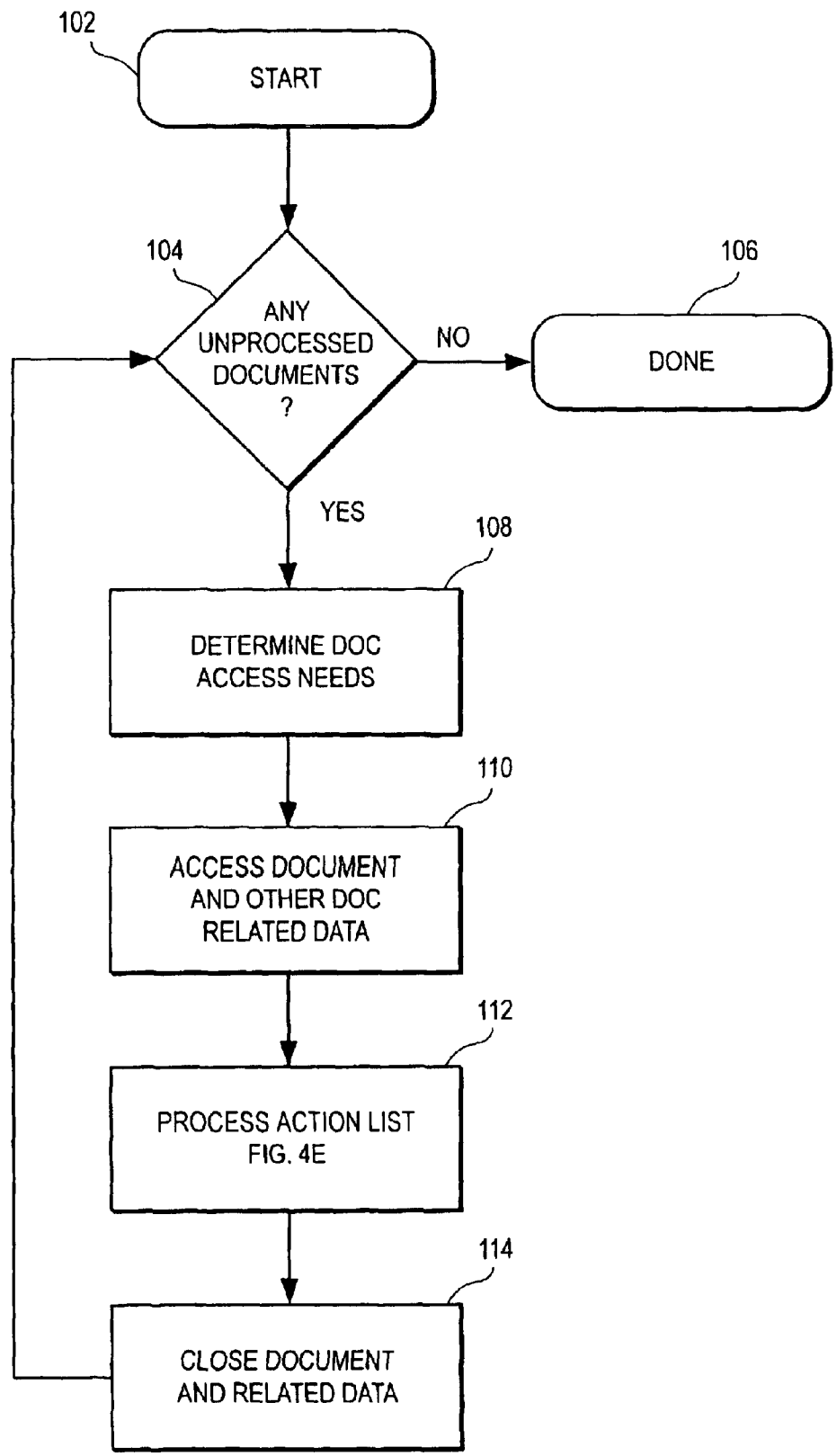
Figure 4E:
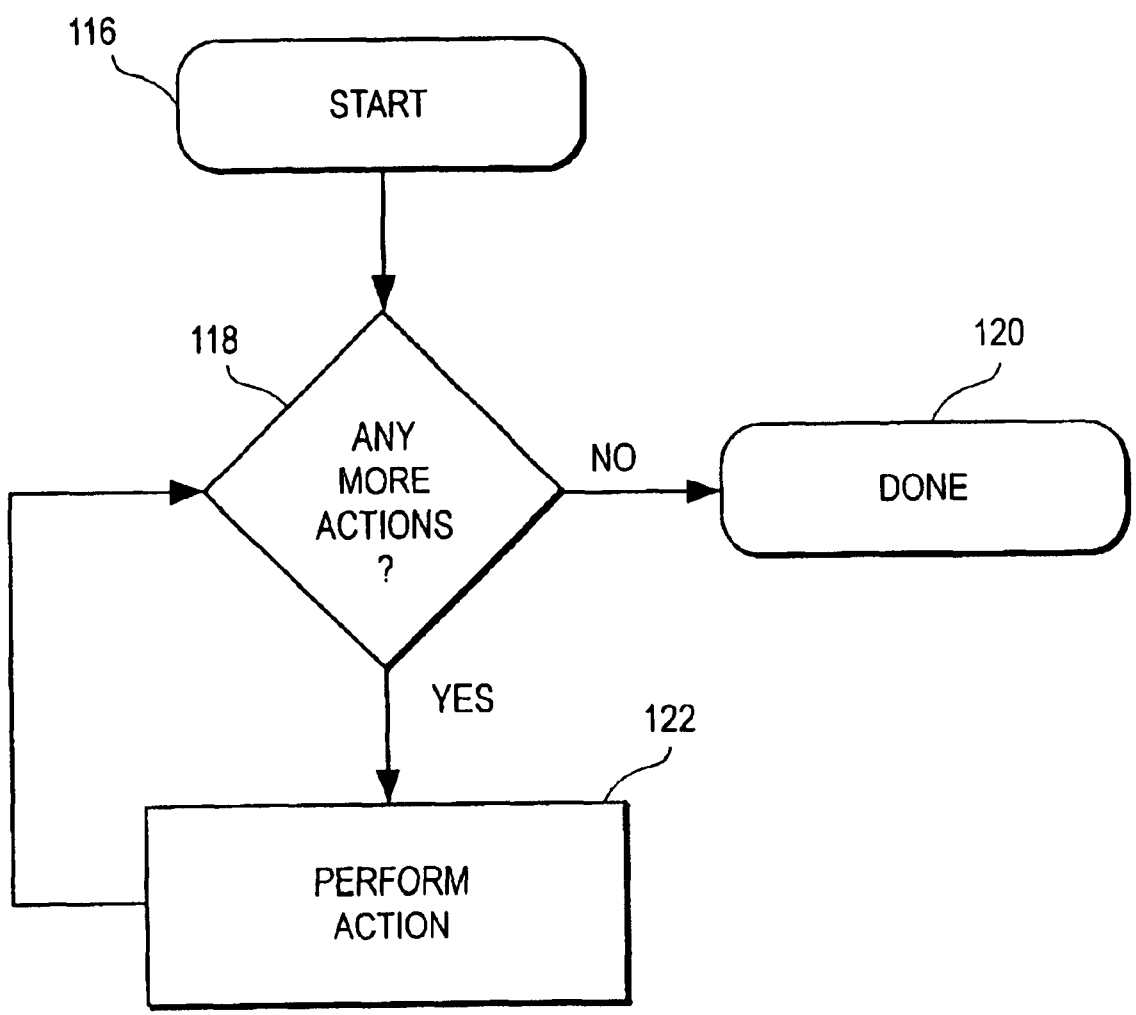
Figure 4F:
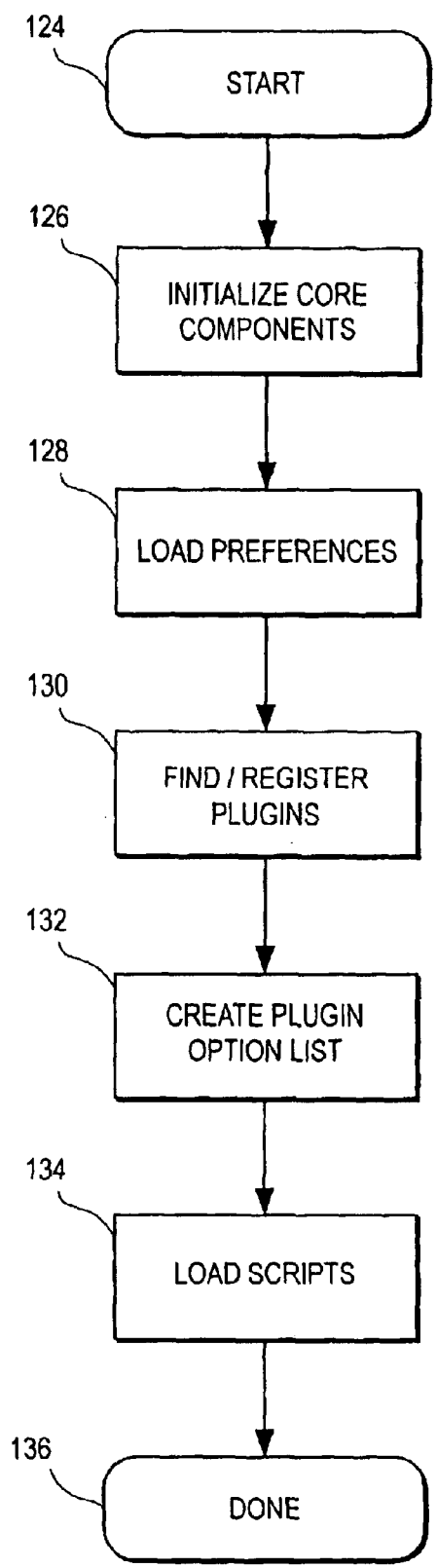
Figure 4G:
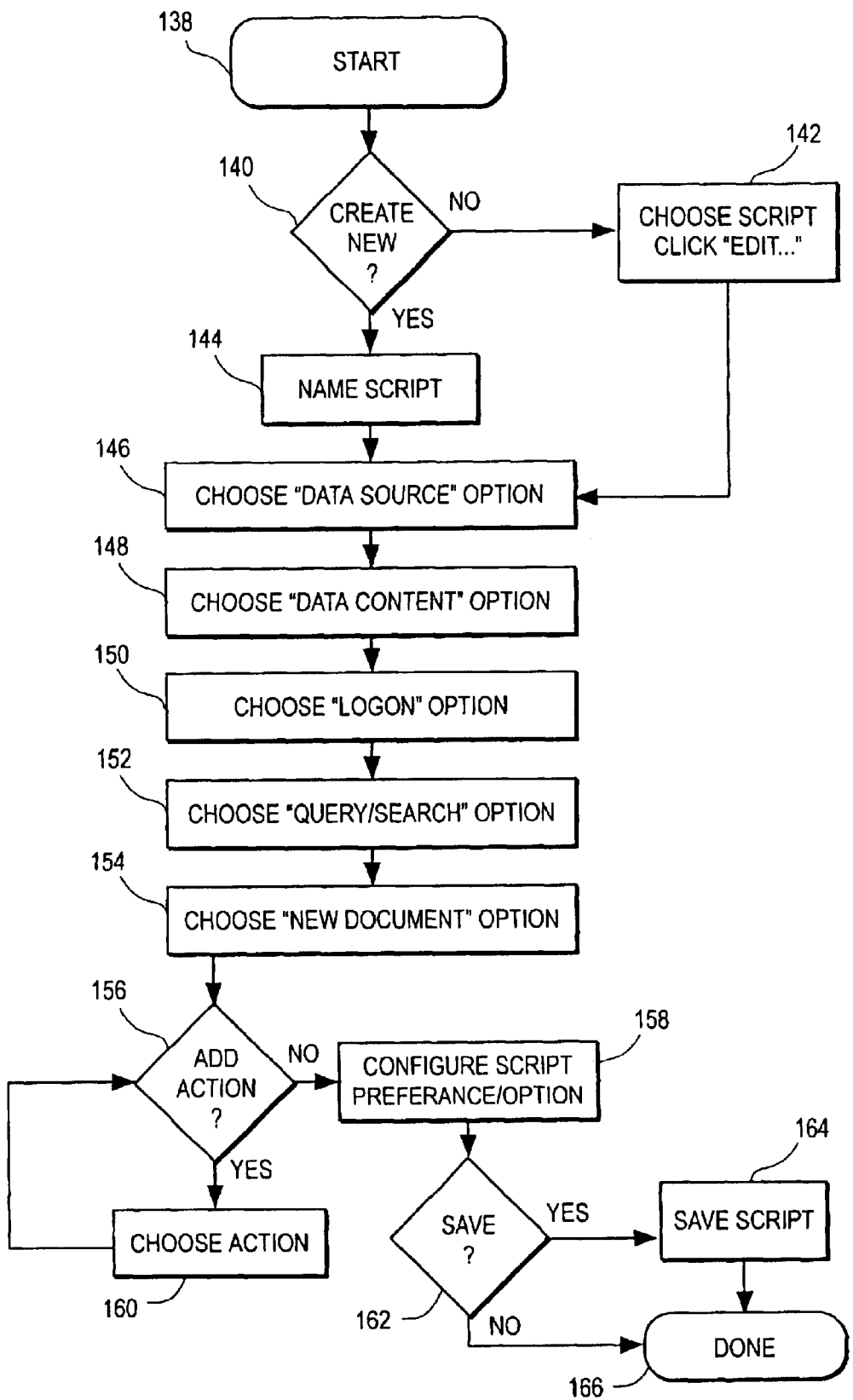

FIGS. 4A–H depict process steps that may be used in conjunction with processing hot files. FIG. 4G shows a flow chart for creating/editing a controlling script for processing information from hot files. Upon entering 138 the edit function, the user may select "create new" 140 to create a new script or "choose script" 142 to edit an existing script.

The controlling script serve two functions. Under a first function, a first set of the scripts function to control parsing of the hot files into its constituent parts. The presence of those constituent parts may then be used in conjunction with the business logic of the user to trigger reformatting decisions necessary to allow the reformatted file to conform to a presentation structure. Parsing may also be used to collect and format an identifier of the data source into meta data that may be used to identify a destination for the file. Identification of a destination for the file also inherently results in the identification of attributes, which the file must possess to be used within the destination space.

Under a second function, a second set of the controlling scripts allows the parsed file to conform to the attributes of the destination. In this case, a set of scripts operates upon the parsed file and associated meta-data to reformat the data to the desired destination.

The scripts discussed herein may perform the first and second functions as part of one continuous stream. Alternatively, separate sets of scripts may be provided for the first and second functions depending upon the business logic of the user.

As used herein, the term "presentation structure" refers to the relationship between the visual aspect of the reformatted file with a presentation of the overall work. In the case of a newspaper, presentation or page structure refers to the placement of articles, photographs, charts, etc. on a page of newsprint.

When creating a new script, the user enters 144 a name of the script. When editing an existing script the user accesses a menu of script names and selects the desired script. The data source for the script may be chosen 146 identifying the hot file. A data content may be entered 148 regarding the format of the hot file. A logon option may be selected 150 to facilitate access to the data source and/or destination. A data destination may be selected by entering a search option 152 or a "create new file" option may be selected 154.

To complete the script, data manipulation (e.g., action) steps may be entered. For example, if the action desired is that of converting a full-width document (e.g., formatted for an 8½×11 inch sheet) to a width compatible with a standard newspaper column then a specific string length would be added 156. Alternatively, a user may choose 160 an action from a menu of possible action (e.g., convert the text to all capital letters). The user may also enter preferences 158, such as font, font size, etc. The user may select "save" 162 followed by saving 164 the script.

Upon creation of a script, the script processor 46 may enter an initialize routine (FIG. 4F). The processor may initialize core components 126, such as its own internal registers and load preferences 128, such as identifiers of hard drives and other storage devices. The processor 46 may search 130 for the locations of plug-ins and create 132 a plug-in option list. Scripts may, in turn, be loaded 134.

Following initialization, the script processor 46 may begin executing 62 (FIG. 4A) scripts. At a specific time, interval of time, occurrence of a predetermined event (e.g. from a receiving database such as QPS), activation by another script or manual activation, the software robot begins running. If the software robot is not specific as to the data set to be processed 74, a default data set is added 76. Otherwise, the software robot 30 searches 78 for a specified data source. It looks for that hot folder or the hot folder containing a hierarchy of folders specified in the script and gathers 64 the data from those folders. The software robot may process 84 all files in those folders, or only those files that match specific criteria based on a file's attributes (e.g. based upon a file extension, creation date, etc.).

If the document still has any unprocessed data sets 66, the script processor 46 logs on 88 to the document management system (DMS) 36 and searches 90 for any matching documents. If the processor finds any matches, it begins processing the folder (FIG. 4D). If not, the processor 46 creates 94 a new document and adds 98 the document to the document list within the DMS 36.

Upon accessing the proper file, the script processor 46 determines whether there are any unprocessed documents 104. If there are no more unprocessed documents, the processor 46 is done 106.

If there are more documents to be processed, the processor 46 determines the access needs of the document 108. Determining the access needs for the document may mean determining what format the document was originally created under and converting 110 the document back to a standard format (e.g., ASCII, XML, etc.).

In determining the access needs of the document, the processor 46 first decides what "type" file is involved (e.g., MS Word, ASCII file, QuarkXPress tag file, HTML document, XML document, WriteNow file, WordPerfect file, etc.). Once the processor 46 determines what type of file is involved, the processor 46 applies the appropriate filter to read the file.

Using the appropriate filter, the processor 46 reads the contents of the file and begins parsing the file to extract specific items which the end user has requested that the processor 46 identify. Parsing the file may simply mean breaking the file up into character strings determined by a parsing criteria based upon a data file descriptor. Parsing may be performed by finding tabs, line returns, a specific number of characters, start of next character, defined text markers, invisible text markers, the end-of-the-file, etc.). The end user also has the option to retain source attributes about the extracted item if the user wishes to preserve this information.

The parsed data and extracted information may be directly used to reformat the parsed data based upon the business logic of the user. Alternatively, the parsed data may be stored as a parsed file under a standard, data neutral format (e.g., XML file, QuarkXPress file, etc.).

Where the hot file is to be stored as a parsed file under XML (e.g., DeskNetAPS-XML), the formatting which has been filtered from the source file is inserted into the XML file as mark-up language. The mark-up language of the XML file may be used as markers for identifying those features of the file (e.g., tabs, carriage returns, end of paragraph, end of section, etc.) which become important for reformatting.

In the alternative, the filtered file may be stored as an QuarkXPress file. In the case of a QuarkXPress file, XPressTags may be used as the mark-up language identifying the formatting boundaries. The QuarkXPress file may be directly converted into a destination specific file type and vice versa.

If desired, the information extracted from the parsed file may be manipulated during reformatting by the processor 46 in any of a number of ways. Manipulation may be accomplished by performing 118, 122 a series of steps by the processor 46 before the extracted item is stored into a "reference named article" and saved into a dataset of meta data (associated with the parsed file), which may be used to trigger further reformatting options. Manipulation options may include: date and time conversion; character set conversion; string conversion; using only portions of the extracted data; limiting string length; converting date to string; padding a string; adding text to a string; etc.

For example, the business logic of the organization may specify a source file format with predetermined locations for information used to trigger formatting options within a destination space. For example, the organization may require that each submitted text file must include a subject matter title or article title, separated from a body copy of the article. An authors name may also be supplied within a particular location of the article either above or below the title.

The parsing operation may be used to recognize titles and an authors name based upon the provided format. The recognized information may be identified as reference named articles and encoded as meta data associated with the parsed file.

Operating under control of the software robot, the processor 46 stores the reference named article as meta data along with the parsed dataset. The processor 46 will continue to parse the file, perform action steps on each extracted item and save the processed extracted data into the dataset as either meta data or mark-up inserts until the file has been completely processed.

Once the source identifier has been recovered and the document has been converted to a standard format, the processor 46 may retrieve and begin processing an action list 112 for the document (FIG. 4E) based upon a set of attributes which the file must conform to within its destination space. To perform the action list, the processor 46 may use more than just the incoming data (i.e., the information read from the incoming file). The processor 46 may also use: source information (e.g., information about the environment surrounding the original file, such as its name or it's placement in the hierarchical folder structure); action data (e.g., information extracted from a sending or host database system or generated by another action step in the software robot); and general information (e.g., date and time, script name, script start time, etc.) Like incoming data, this information (i.e., source information, action data and general information) may also be stored by the processor 46 as reference named objects.

The processor 46 takes the reference named objects associated with the parsed file and matches them up to a receiving database, file or action, based upon information entered by the end user as to what matches will be used to create a linking and action step based upon that linking. For example, the software robot operating on the processor 46 may be used to create a new corresponding data file of any particular file type and place information into this file, structured in a way determined by the end user. The new file is created by mapping the parsed data into a portion of the corresponding data file based upon the match between the parsed data and attributes of the data structure under the second format at the destination. This mapped information may be generated based upon a single reference named object or a combination of reference named objects, including static textual information configured into a specified structure.

For example, an author's name may be identified within a file based upon a predetermined format. The software robot may formulate the authors name into a reference named article called "author's name". An attribute of the file may include a script named "author's name" which maps the authors name and author's location into an article header.

The action list and destination would be retrieved based upon the identifier of the author. The action list may include a script called "author's name" and function to scan for the reference named article called "author's name." Once the name is retrieved, the script may retrieve the author's location from memory and map the name and location into an article header.

Using the analogy of the sports writer submitting articles to a sports page of a newspaper, the host computer may use a knowledge of passwords entered upon file transfer (and stored as meta data) to map the writer's name into a byline located at a predetermined location within the edited file (i.e., within its destination). Alternatively, an attribute of the corresponding data file may be a location where the reporter is working. The host computer may map the geographical location of the writer into a subtitle of a headline of the article.

Further, attributes of the corresponding data file (i.e., the newspaper) could be used in other ways to map data into the presentation structure of the newspaper data file. A page building utility (e.g., DeskNetAPS-PageBuilder) may be used to populate the presentation space. In the case of identifying the writer of the newspaper article by password, the identity of the writer could be compared with a table of writers. Where a match is found indicating that the writer is a sportswriter, the article could be mapped into a predetermined destination on a sports section of the newspaper.

The processor 46 may search for other database files or elements and update, append or replace information. The processor can be used to automate creation of host database records or modification of existing records. Nearly any type of data can be replaced or modified. A simple example, is in the case of the sports writer first submitting an article and then later submitting an amended article. Another example is the system appending a summary of a previous, related article.

It is possible and likely that one script may call another to run. For example, a script that imports information may process that information and then export the information back out to some other destination (e.g., a database, another newspaper publisher, etc.).

In general, the stored reference objects in each data set is matched up with its host file, database or actions and processed into a structured file. Datasets are processed one at a time until all have finished. If an error occurs for some reason, the dataset is skipped and the next dataset is processed.

For example, in the case of the newspaper article, the article may be mapped into two different destination spaces. The first destination may be the newspaper page discussed above. However, once mapped into the presentation structure of the newspaper page, the business logic may require that the article be e-mailed to an editor who may wish to review the content and style of the article. In this case, the first controlling script (which maps the article into the newspaper) triggers another second script for creation of the e-mail message. It should be understood that the attributes of the first script would be entirely different than the attributes of the second script.

Figure 8:
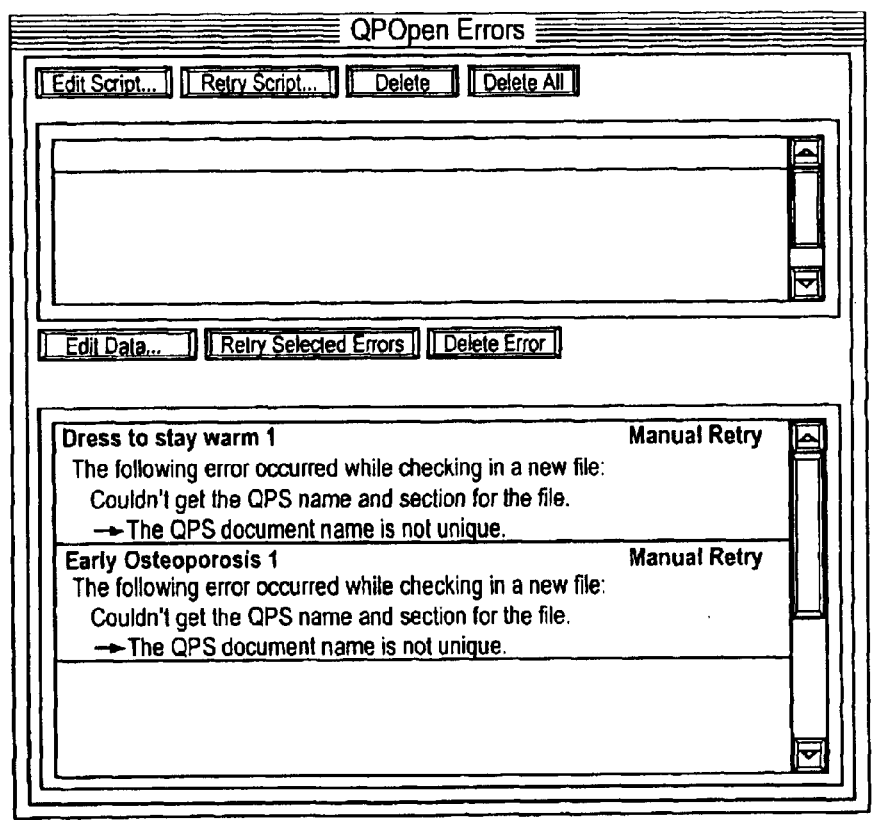
FIG. 8 depicts a QP open errors menu screen that may be used by the system of FIG. 1.

Errors are reported in a floating error palette window (FIG. 8). If the error is one that can be automatically retried, the processor 46 will periodically run the errored dataset again. If they don't run successfully, or it is an error type which needs manual intervention, the error will be reported as shown in FIG. 8. In the error palette, the end user can read the reported error and if it is a problem associated with the script, the end user can directly edit the script and either retry each dataset individually or all the datasets with errors together. Only datasets with errors are retried. If the reported error is a data-related error, the end user can directly edit the data in each dataset and retry the offending dataset.

Under another embodiment of the invention, data may be imported from a database. Where the data is imported from a database, a different process is used because the source of the file is not a hot folder. In this case, the processor 46 either monitors the database, waiting for actions within the database to occur and detecting the actions either from within the originating or receiving database (triggering database actions are end user defined) or waits for the database to send a triggering event to the software robot to begin a file open script.

Once the script is running, the processor 46 will not bother with determining a file type, since it is a database. Instead, the processor 46 goes directly to the database and finds the information it needs to extract as requested by the end user. As above, the end user determines a file descriptor, which delimits the desired information (e.g., tabs, line returns, a specific number of characters, start of next character, defined text markers, invisible text markers, the end-of-the-file, etc.). As above, the end user also has the option to retain style information about the extracted item, if the user wishes to preserve this information.

Once the information is extracted, the user can perform data manipulations on the extracted data based upon the attributes list. As above, the data manipulations may include: date and time conversion; character set conversion; string conversion; using only portions of the extracted data; limiting string length; converting date to string; padding a string; adding text to a string; etc. Once the data has been manipulated it may be stored as a reference named object into a dataset.

Once stored into a dataset, the processor 46 matches the dataset as described above. Errors are also handled as described above.

In another embodiment, the system 10 may be used to export data. The software robot can run and extract information from a database system or electronic file and export it out to another file structure and file type, as requested by the end user. Again the end user determines and configures the processor 46 to determine what data needs to be extracted, how it is reconstituted in addition to the static elements that the user may include. Like the import example, the extracted information may be manipulated before it is stored as reference named objects and saved as a dataset. The exported information may include style information about how the stream of text existed within the originating file format or database.

In addition to exporting a file with a user defined structure and file type, the software robot allows for specific location placement of the exported file. End users can determine the hot folder location where the data is to be delivered by the software robot. This hot folder location can also have a hierarchy of sub-folders. The software robot can use any of the extracted data, action information, general information, (or source and incoming data information—if there is such information) to move through a sub folder hierarchy and place the exported file in an appropriate location. If the folder does not exist within the subfolder hierarchy, the software robot can automatically create it so the folder directory structure is complete. The functionality is particularly unique and lets the end user automatically organize information, while exporting the information to files.

In another embodiment, extracted information can be sent directly to a database. The software robot may use data information extracted or stored as reference named objects in data sets to query a database and replace, append or even create new items. This may happen directly, without the use of an intermediary file format. Data can be placed within the database, while retaining style information. Database access is facilitated based upon the use of an open database construct (e.g., DeskNetAPS-ODBC) in conjunction with an appropriate database server (e.g., Oracle, Microsoft SQL, etc.).

An asset management system (e.g., DeskNetAPS-MediaBank) is provided for archiving graphical media (e.g., under MS Word, XML, etc.). A user may enter descriptive information about the files as meta data. Search capabilities are provided for specific files based upon search terms matching information stored as meta data or content.

Another graphics manipulation package (e.g., DeskNetAPS-Image) may be used to change certain characteristics of images. Sizes may be expanded or reduced. Resolution may be enhanced or reduced.

In another embodiment, the software robot can be used to print particular files. This process is particularly useful since the software robot saves a printing setup file that may be used as a template (configured by the end user) so that when the software robot next prints, it may repeat the same process. Printing can take a number of forms like printing a native file, creating and printing an EPS file and creating and printing a .PDF file.

In another embodiment, the software robot may be used to archive files. The software robot may be used to archive native files by copying the entirety of the file, or database, if requested. Like exporting to a file, the software robot allows for specific location placement of the exported file. End users can determine the hot folder location for the software robot to drop the archived file. This hot folder location can also have a hierarchy of sub-folders. The software robot can use any of the extracted data, action information, general information, (or source and incoming data information, if there is such information) to move through a sub-folder hierarchy and place the exported file appropriately. If the folders do not exist within the sub-folder hierarchy, the software robot can automatically create them so the folder directory structure is complete. This functionality is particularly unique and lets the end user organize information while archiving.

In its broadest sense, the software robot functions as an "assembly line" for building electronic data product. It takes "raw material" from a source and assembles the raw material into one or more products.

The first step is to locate the source of the raw material and determine if there is any raw material that should be processed by the assembly line.

If the software robot finds raw material to process, it extracts the raw material from the source and compartmentalizes it into "bins" on the assembly line.

Each "bin" moves to the next step in the assembly line which matches the raw material to a specific "product" located in a "product repository". The product, once it is identified, is brought into the assembly line.

The software robot gathers information about the product including the intended location (i.e., destination) of the raw material. Based on the gathered information from the product, the software robot manipulates the raw material to conform to its location. The software robot then places the raw material into the product at the intended location.

The software robot distributes the gathered product information and assembly line status information for external use.

With the raw material in place in the product, the product can be returned to the product repository for further work or can be released for distribution.

Writer in the Field Submitting Story Example

A writer in the field submits a story (MS Word document, etc.) to their employer by dialing into the corporate network and dropping their work into an electronic drop folder.

The software robot monitors the electronic drop folder (i.e., Hot Folder) and when it senses that a new file is there, determines whether the "raw material" from the file should be brought into the "assembly line". The "raw material" is the content of the data file i.e. the story the writer submitted (body copy) and its file name (story1.doc).

If the raw material needs to be refined before it is brought into the assembly line, the file is run through a filter of the software robot. This writer's file would be run through a MS Word filter so that any special styles may be maintained as the file is then parsed into its unique data sets. This file will have two pieces of data: the filename and the content respectively.

The software robot will now analyze the data sets and query the document management system (e.g. QPS) for a layout that matches the data set information. When it finds the appropriate match (layout) from the product repository (e.g. QPS), the software robot will pull the layout into the production line so it can act upon it.

The software robot will now open the layout and gather detailed information from the product layout that it has pulled from the product repository. This information will be the text box specifics (i.e. location, size etc.). The software robot will then manipulate the data, first by stripping the filename extension (.doc) from the file name and place it into the appropriate text box within the product layout. The software robot will then place the body copy into its appropriate text box. When this is complete and the software robot has verified that all these steps have been completed without errors, the software robot will then place the product layout back into the QPS document management system.

Middleware Monitoring Another Database for Data Change Example

The software robot monitors an Oracle database for any data changes that might effect the creation of a product. The software robot sees through its monitoring that some data has changed in the Oracle database and performs an SQL query to get the data (Raw material) that has changed. This data will be the layout name and due date. The software robot will parse the incoming data from the oracle database (db) into data sets.

The software robot will now analyze the data sets and query the QPS document management system for a layout that matches the data set information (i.e., the file name). When it finds the appropriate match (layout) from the product repository (QPS document management system) the software robot will pull the layout into the production line so it can act upon it.

The software robot will now open the layout and gather detailed information from the product layout that it has pulled from the product repository. In this case it is looking for all associated schedule information within this product layout. The software robot will then manipulate the date information it has received from the Oracle database and convert its due date format into the correct due date format for this schedule in the QPS document management system. The software robot will then place the converted due date information into this products schedule information.

When this is complete and the software robot has verified that all these steps have been completed without errors, the software robot will then place the product layout back into the QPS document management system. Upon returning the Product layout to the QPS document management system all concerned parties will be notified that this products due date has changed.

Photographer in the Field Submitting Photo Example

A Photographer in the field submits a digital image (TIFF, EPS etc.) to their employer by dialing into the corporate network and dropping their work into an electronic drop folder.

The software robot monitors the electronic drop folder (i.e., Hot Folder) and when it senses that a new file is there, determines whether the "raw material" from the file should be brought into the "assembly line". The "raw material" is the content of the data file i.e., the image file submitted (image), its meta-data (TIFF header) and its file name (image1.tif).

The image, its file name and its meta-data will be parsed into its unique data sets. This file will have three pieces of data the file name, any meta data from the tiff header and the image, respectively.

The software robot will now analyze the data sets and query the QPS document management system for a layout that matches the data set information. When it finds the appropriate match (layout) from the product repository (QPS document management system) the software robot will pull the layout into the production line so it can act upon it.

The software robot will now open the layout and gather detailed information from the product layout that it has pulled from the product repository. This information will be the image box specifics (i.e. location, size, shape, etc.). The software robot will then place the image into its appropriate image box. When this is complete and the software robot has verified that all these steps have been completed without errors, the software robot will then place the product layout back into the QPS document management system.

If the image needs to be delivered to another presentation space, the software robot will manipulate and convert the image files to a format (e.g. JPEG, GIF, etc.) based upon the attributes of and the business logic associated with that other presentation space.

The Software Robot Uses Raw Material and Product from QPS Example

The software robot monitors the QPS document management system and performs actions on existing content and products.

A software robot script would be created that checks the QPS document management system at scheduled intervals for any additions of raw material or changes to product.

IF there are changes or additions to the QPS document management system. The software robot will create a dataset for matching with the file/s that have been added or changed.

The software robot will then find all matches to the newly created dataset and request those layouts or articles from the QPS database. The software robot will pull the layouts or articles into the production line so it can act upon them.

The software robot will now open the layouts or articles and gather detailed information from the product layout or article that it has pulled from the product repository.

In this example the software robot will make an EPS (image file) out of one of the layouts and export it to a folder on a file server. The software robot will also open an article and manipulate and convert it to a format (e.g. HTML, XML, etc.) based upon the attributes of and the business logic associated with a destination presentation space (e.g. internet, intranet, world wide web, etc.). The converted content can then be immediately posted to the destination presentation space.

After these two actions are complete and the software robot has verified that all these steps have been completed without errors, the software robot will then place the product layout and article back into the QPS document management system.

A specific embodiment of a method and apparatus of transferring files according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of converting a data file received by an automated publishing system from a source for use within one of a plurality of presentation spaces of the automated publishing system according to a business logic of an organization using the publication system, such method comprising the steps of:

parsing the data file received from the source to recover an identifier of the source based upon the business logic of the organization using the publication system and an information content to be used by the automated publication system;

identifying a presentation space of the plurality of presentation spaces for the parsed file based upon the identifier of the source and the business logic of the organization using the publication system; and reformatting the information content of the parsed file for use within the identified presentation space based upon a set of predetermined attributes associated with the identified presentation space.

2. The method of converting a data file as in claim 1 further comprising defining the source as a personal computer receiving the information content from a human user.

3. The method of converting a data file as in claim 1 wherein the step of reformatting the information content further comprises transferring the reformatted information content to a page layout tool.

4. The method of converting a data file as in claim 1 wherein the step of recovering an identifier of the source further comprises processing meta data of the data file.

5. The method of converting a data file as in claim 4 further comprising matching a title of the data file with a title assigned to the source.

6. The method of converting a data file as in claim 4 further comprising matching a name within a header of the file with a name of the source.

7. The method of converting a data file as in claim 4 further comprising determining a format of the data file from the meta data.

8. The method of converting a data file as in claim 7 further comprising selecting a filter for recovering formatting information based upon the determined format of the data file.

9. The method of converting a data file as in claim 8 further comprising formulating the predetermined attributes based on a business logic and purpose of an organization using the automated publishing system.

10. The method of converting a data file as in claim 9 wherein the step of formulating the predetermined attributes based on a business logic further comprises defining a template having relatively fixed outside dimension and the plurality of presentation spaces inside.

11. The method of converting a data file as in claim 10 wherein the step of defining the template further comprises defining the template as a newspaper page.

12. The method of converting a data file as in claim 11 wherein the step of defining the template as a newspaper page further comprises defining the identified presentation space as a column space assigned to the source.

13. The method of converting a data file as in claim 12 wherein the step of defining the identified space as a column space assigned to the source further comprises defining a table of formatting requirements defining the assigned column space.

14. The method of converting a data file as in claim 13 further comprising applying the formatting filter to the data file to recover formatting information.

15. The method of converting a data file as in claim 14 further comprising inserting the recovered formatting information as mark-up inserts into the parsed information content.

16. The method of converting a data file as in claim 15 wherein the step of reformatting further comprises sequentially processing the information content of the data file in accordance with the table of formatting requirements for the identified space until encountering a mark-up insert and then comparing the encountered mark-up insert with formatting entries within the table and where a corresponding formatting requirement is found executing the corresponding formatting requirement.

17. The method of converting a data file as in claim 1 further comprising defining the presentation space as an e-mail message.

18. The method of converting a data file as in claim 17 further comprising retrieving an e-mail address from a database based upon the source identifier.

19. The method of converting a data file as in claim 18 further comprising composing the e-mail message.

20. The method of converting a data file as in claim 19 further comprising retrieving additional information regarding the source from the database.

21. The method of converting a data file as in claim 20 further comprising appending the additional information to the composed e-mail message.

22. A method of converting a data file received from a source for use at one of a plurality of destinations according to a business logic of an organization using the converted data file, such method comprising the steps of:

parsing the data file received from the source to recover an identifier of the source based upon the business logic of the organization using the converted data file and an information content;

identifying a destination of the plurality of destinations for the parsed file based upon the identifier of the source;

identifying a set of predetermined attributes associated with the identified destination based upon the recovered identifier of the source; and reformatting the information content of the parsed file for use at the identified destination based upon the identified set of predetermined attributes.

23. The method of converting data files as in claim 22 wherein the step of recovering the source identifier further comprises processing meta information of the file.

24. The method of converting data files as in claim 22 further comprising defining the source as a personal computer receiving the information content from a human user.

25. The method of converting data files as in claim 22 wherein the step of identifying the set of predetermined attributes further comprises formulating a set of formatting requirements of the predetermined attributes based upon a business logic of the destination.

26. The method of converting data files as in claim 25 wherein the step of formulating the set of a set of formatting requirements further comprises presenting the formatted file as textual information with other files on a page of a newspaper.

27. The method of converting data files as in claim 26 wherein the step of formulating the set of formatting requirements further comprises providing a headline for the textual information with a larger relative font size than a remainder of the textual information.

28. The method of converting data files as in claim 27 wherein the step of formulating the set of formatting requirements further comprises providing a byline for the textual information.

29. The method of converting data files as in claim 28 wherein the step of providing a byline further comprises importing a name of a writer of the textual information based upon the source identifier.

30. The method of converting data files as in claim 25 further comprising composing an e-mail message to a third party including the reformatted file as textual information.

31. The method of converting data files as in claim 25 wherein the step of formulating the set of formatting requirements further comprises preparing the file for storage as an HTML or XML construct.

32. The method of converting data files as in claim 25 further comprising retrieving information associated with the source from a database.

33. The method of converting data files as in claim 32 further comprising reformatting the information content of the retrieved information for use at the destination based upon the set of predetermined attributes required by the destination.

34. The method of converting data files as in claim 33 further comprising composing an e-mail message to the source including the reformatted parsed file and retrieved information.

35. A method of converting a data file received from a source for use at a destination according to a business logic of an organization using the converted data file, such method comprising the steps of:

parsing the data file received from the source to recover an identifier of the source based upon the business logic of the organization using the converted data file, an identifier of a format of the data file and an information content;

identifying a destination for the parsed file based upon an identifier of the source;

retrieving a set of formatting requirements based upon the identified destination; and reformatting the information content of the parsed file for use at the destination based upon the identified format of the data file and the set of formatting requirements of the destination.

36. The method of converting a data file as in claim 35 wherein the step of retrieving the set of formatting requirements required by the identified destination for the identified source further comprises retrieving a predetermined location for the reformatted file within a portion of a larger destination document.

37. The method of converting a data file as in claim 35 wherein the step of parsing the file further comprises applying a formatting filter to recover formatting information.

38. The method of converting a data file as in claim 37 wherein the step of applying a formatting filter further comprises converting the filtered file into an XML file with the filtered formatting information inserted as mark-up language.

39. An apparatus for converting a data file received by an automated publishing system from a source for use within one of a plurality of presentation spaces of the automated publishing system according to a business logic of an organization using the publication system, such apparatus comprising:

means for parsing the data file received from the source to recover an identifier of the source based upon the business logic of the organization using the publication system and an information content to be used by the automated publication system;

means for identifying a presentation space of the plurality of presentation spaces for the parsed file based upon the identifier of the source; and means for reformatting the information content of the parsed file for use within the identified presentation space based upon a set of predetermined attributes associated with the identified presentation space.

40. An apparatus for converting a data file received from a source for use at one of a plurality of destinations according to a business logic of an organization using the converted data file, such apparatus comprising:

means for parsing the data file received from the source to recover an identifier of the source based upon the business logic of the organization using the converted data file and an information content;

means for identifying a destination of the plurality of destinations for the parsed file based upon the identifier of the source;

means for identifying a set of predetermined attributes associated with the identified destination based upon the recovered identifier of the source; and means for reformatting the information content of the parsed file for use at the identified destination based upon the identified set of predetermined attributes.

41. An apparatus for converting a data file received from a source for use at a destination according to a business logic of an organization using the converted data file, such apparatus comprising:

means for parsing the data file received from the source to recover an identifier of the source based upon the business logic of the organization using the converted data file, an identifier of a format of the data file and an information content;

means for identifying a destination for the parsed file based upon an identifier of the source;

means for retrieving a set of formatting requirements based upon the identified destination for the identified source; and means for reformatting the information content of the parsed file for use at the destination based upon the identified format of the data file and the set of formatting requirements of the destination.

42. An apparatus for converting a data file received by an automated publishing system from a source for use within one of a plurality of presentation spaces of the automated publishing system according to a business logic of an organization using the publication system, such apparatus comprising:

a parsing processor adapted to parse the data file received from the source to recover an identifier of the source based upon the business logic of the organization using the publication system and an information content to be used by the automated publication system;

a destination processor adapted to identify a presentation space of the plurality of presentation spaces for the parsed file based upon the identifier of the source; and a formatting processor adapted to reformat the information content of the parsed file for use within the identified presentation space based upon a set of predetermined attributes associated with the identified presentation space.

* * * * *